United States Patent
Böldicke et al.

(10) Patent No.: US 9,419,710 B2
(45) Date of Patent: Aug. 16, 2016

(54) ACTIVE OPTICAL CABLE ASSEMBLIES AND METHODS FOR THERMAL TESTING THEREOF

(71) Applicant: CORNING OPTICAL COMMUNICATIONS LLC, Hickory, NC (US)

(72) Inventors: Sören Böldicke, Potsdam (DE); Davide Domenico Fortusini, Ithaca, NY (US); Rebecca Kayla Schaevitz, Sunnyvale, CA (US); Martin Spreemann, Berlin (DE); Eric Stephan ten Have, Berlin (DE)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 56 days.

(21) Appl. No.: 14/465,921

(22) Filed: Aug. 22, 2014

(65) Prior Publication Data
US 2016/0056890 A1 Feb. 25, 2016

(51) Int. Cl.
*H04B 10/07* (2013.01)
*H04B 10/079* (2013.01)
*H04B 10/25* (2013.01)

(52) U.S. Cl.
CPC ............ *H04B 10/0795* (2013.01); *H04B 10/25* (2013.01)

(58) Field of Classification Search
CPC ........................................................ H04B 10/07
See application file for complete search history.

(56) References Cited

U.S. PATENT DOCUMENTS

| | | | |
|---|---|---|---|
| 7,093,172 B2 * | 8/2006 | Fan | H04L 1/241 370/249 |
| 7,371,014 B2 * | 5/2008 | Willis | G02B 6/3887 385/24 |
| 7,738,796 B2 | 6/2010 | Sanchez | 398/197 |
| 2005/0265717 A1 * | 12/2005 | Zhou | G01M 99/002 398/9 |

FOREIGN PATENT DOCUMENTS

CN 100373822 C 3/2008 ............. H04B 10/08

* cited by examiner

*Primary Examiner* — Shi K Li

(57) ABSTRACT

Active optical cable assemblies and methods for thermally testing active optical cable assemblies are disclosed. In one embodiment, a method of thermally testing an active optical cable assembly includes providing electrical signals to an optical transmission module within a first connector that converts the electrical signals into optical signals for transmission over one or more optical fibers of the active optical cable assembly, and applying heat to the first connector as the electrical signals are provided to the optical transmission module. The method further includes detecting electrical signals at a second connector of the active optical cable assembly. The detected electrical signals are converted from the optical signals by an optical receiver module within the second connector. The method further includes determining if the optical transmission module satisfies a benchmark at a threshold temperature of the optical transmission module based on the electrical signals detected at the second connector.

23 Claims, 6 Drawing Sheets

ACTIVE OPTICAL CABLE ASSEMBLIES AND METHODS FOR THERMAL TESTING THEREOF

BACKGROUND

1. Field

The present disclosure generally relates to active optical cable assemblies and, more particularly, to active optical cable assemblies and methods for thermally testing active optical cable assemblies.

2. Technical Background

As the data rate of communication protocols increases, it becomes difficult to transmit signals using purely electrical cables. Optics has provided a solution to the distance versus data rate problem for the telecommunication and data center markets. Benefits of optical fiber include longer reach, extremely wide bandwidth, low noise operation. Because of these advantages, optical fiber is increasingly being used for a variety of applications, including, but not limited to, broadband voice, video, and data transmission. Optical fiber is emerging as the lowest cost and most compact interconnect technology in an increasing number of consumer electronics applications, especially at lengths greater than a few meters.

Active optical cable assemblies convert signals from electrical-to-optical and optical-to-electrical using integrated circuits within the connector housings. By way of example, active optical cable assemblies use components such as laser diodes for transmitting optical signals over optical fibers, and components such as photo diodes for receiving optical signals for conversion back into electrical signals. The temperature of the components of the active optical cable assembly may impact performance of the assembly. For instance, the temperature of the laser diode used for transmitting optical signals may be a source of a reduction in optical power of the transmitted optical signal. Specifically, reduced optical power of the transmitted signal may result in the optical signal being undetectable by the photodiode at the opposite end of the active optical cable assembly. In some cases, an active optical cable assembly may operate properly at factory conditions during manufacturing, but a reduction in optical power due to a variety of sources may cause the active optical cable assembly to fail to function properly during operation in the field.

Accordingly, there is a need for alternative active optical cable assemblies and methods of thermally testing active optical cable assemblies that address reliability of the active optical cable assemblies.

SUMMARY

Embodiments of the present disclosure are directed to active optical cable assemblies and methods for thermally testing active optical cable assemblies for thermally-induced optical power reduction. More specifically, the thermal testing methods described herein enable testing of active optical cable assemblies after manufacturing. Methods described herein may utilize external or internal heat sources to raise the operating temperature of an optical transmission module including a laser diode across a range of desired temperatures for the active optical cable assembly. Methods described herein then evaluate received electrical signals from optical signals against one or more qualitative and/or quantitative benchmarks to determine if the particular active cable assembly passes the thermal test.

In one embodiment, a method of thermally testing an active optical cable assembly includes providing electrical signals to an optical transmission module within a first connector that converts the electrical signals into optical signals for transmission over one or more optical fibers of the active optical cable assembly, and applying heat to the first connector to raise the temperature of the optical transmission module over a range of desired temperatures as the electrical signals are provided to the optical transmission module. The method further includes detecting electrical signals at a second connector of the active optical cable assembly as the temperature of the optical transmission module is raised. The detected electrical signals are converted from the optical signals on the one or more optical fibers by an optical receiver module within the second connector. The method further includes determining if the optical transmission module satisfies a benchmark at a threshold temperature of the optical transmission module based on the electrical signals detected at the second connector.

In another embodiment, an active optical cable assembly includes an optical cable including at least one optical fiber, a first connector having a first plurality of electrical contacts, and a second connector having a second plurality of electrical contacts. The first connector is optically coupled to a first end of the optical cable, and the second connector is optically coupled to a second end of the optical cable. The first connector includes an optical transmission module and an internal heat generating test component. The optical transmission module is configured to convert electrical signals received at the first plurality of electrical contacts into optical signals for transmission over the at least one optical fiber. The internal heat generating test component is configured to generate heat to raise a temperature of the optical transmission module over a range of desired temperatures as the optical transmission module converts the electrical signals into the optical signals. The second connector includes an optical receiver module within the second connector that converts the optical signals received on the at least one optical fiber into converted electrical signals that are provided to the second plurality of electrical contacts. Consequently, the performance of the active optical cable assembly may be tested over a desired temperature range for the desired performance.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments of the present disclosure are directed to active optical cable assemblies and methods for thermally testing active optical cable assemblies. An active optical cable converts an external electrical signal into an internal optical signal for transmission within the cable, and then converts the optical signal back into an external electrical signal on the receiving end of the cable. Accordingly, the information is transmitted optically via optical fibers between the two ends of the cable. Active optical cable assemblies may be used for high bandwidth data transmission applications where conventional electrical cables are limited by frequency dependent signal attenuation and thus very short lengths. Active optical cable assemblies also have a smaller cable diameter and greater flexibility since they do not need electrical shielding.

Active optical cable assemblies use components such as laser diodes to transmit optical signals converted from electrical signals, and photo diodes to convert received optical signals back into electrical signals. Among other sources such as optical misalignment of components, operating temperature of the laser diode is a source of a reduction in optical power that may impact proper transmission and receipt of data across an active optical cable assembly. If the laser diode is well characterized for a given drive current, and the optical engines provide readout of the receiver signal level after the assembly (often referred to as the received signal strength indicator (RSSI)), the reduction in optical power may be determined. However, often this is not possible after the assembly of the active optical cable assembly, which may make quality control of the active optical cable assembly difficult. The active optical cable assembly may work properly at current factory conditions, but due to insufficient optical margin from manufacturing misalignment, the active optical cable assembly could fail to function during normal operation due to one or more issues such as elevated temperature, misalignment of the optical elements, etc. The concepts disclosed herein allow for testing of the active optical cable assemblies for the desired optical margin.

Embodiments of the present disclosure are directed to active optical cable assemblies and method for thermally testing active optical cable assemblies for temperature-dependent reduction in optical power. Systems and thermal testing methods incorporating external or internal heat sources for thermally testing active optical cable assemblies are described in detail below. Additionally, quantitative and qualitative methods for thermally testing active optical cable assemblies are also described in detail below.

Figure 1:
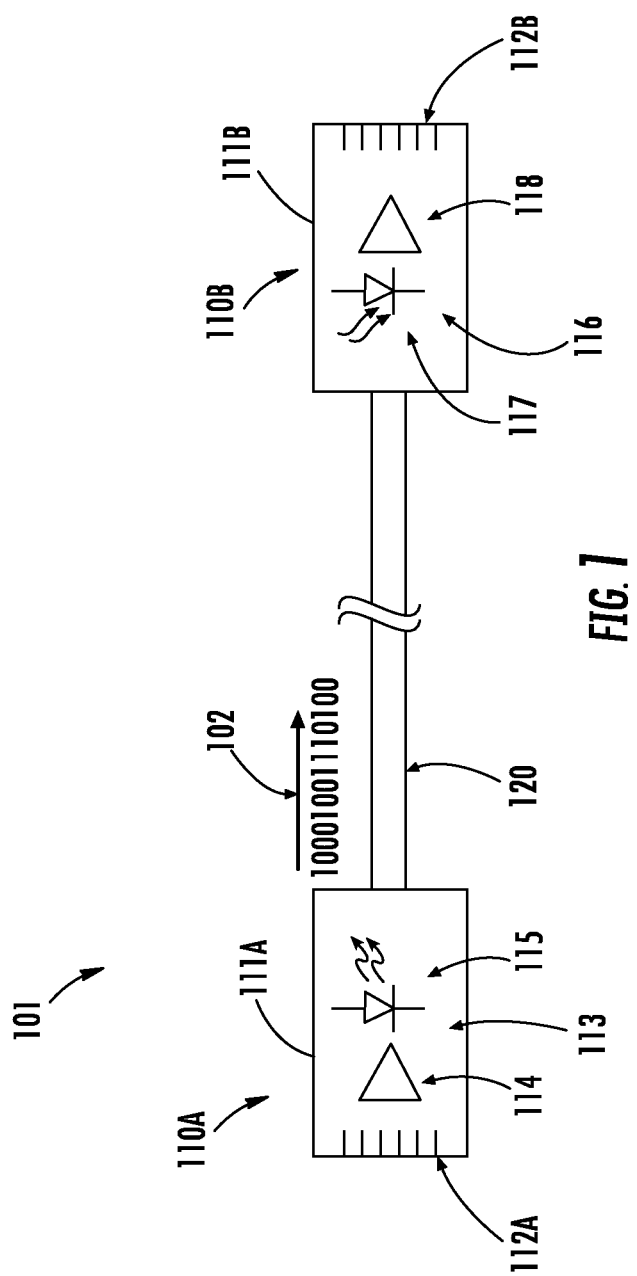
FIG. 1 schematically depicts an example optical cable assembly according to one or more embodiments described and illustrated herein.

Referring now to FIG. 1, an example active optical cable assembly 101 is schematically illustrated. Generally, the active optical cable assembly 101 comprises a first connector 110A at a first end of an optical cable 120 and a second connector 110B at a second end of the optical cable 120. One or more optical fibers (not shown) are disposed in the optical cable 120. The first and second connectors 110A, 110B include a housing 111A, 111B in which various electrical components are disposed. The first and second connectors 110A, 110B include first and second plurality of electrical contacts 112A, 112B, respectively. The first and second connectors 110A, 110B may be both configured as plug connectors, receptacle connectors, or a combination of a plug connector and a receptacle connector. The first and second connectors 110A, 110B are configured to be electrically connected to complementary ports of an electronic device, such as, but not limited to, a server device, a personal computer, an external storage device, a photographic device, a display device, a cellular phone, and a media player.

The optical cable assemblies described herein are active optical cable assemblies in the sense that they actively convert optical and electrical signals within the cable. More specifically, the active optical cable assemblies described herein are configured to receive electrical signals at the plurality of electrical contacts of the first and/or second connector, convert the electrical signals into optical signals for optical transmission over the optical cable, and then convert the optical signals back into electrical signals at the opposite end of the optical cable. As used herein, the term "optical engine" means the collective electrical components that enable the conversion between electrical signals and optical signals. Such electrical components of the optical engine may include, but are not limited to, an optical transmitter module (e.g., including, but not limited to, a laser diode, a laser driver, an amplifier, and the like), an optical receiver module (e.g., including, but not limited to, a photodiode, a transimpedance amplifier, and the like), an equalization circuit, a pre-emphasis circuit, a clock and data recovery circuit, and the like.

Still referring to FIG. 1, an optical transmission module 113 (i.e., a subcomponent of an optical engine) is disposed within the housing 111A of the first connector 110A, and an optical receiver module 116 is disposed within the housing 111B of the second connector 110B. It is noted that each of the first and second connectors 110A, 110B may include both an optical transmission module 113 and an optical receiver module 116, and that FIG. 1 depicts a uni-directional active optical cable assembly 101 for ease of illustration. Accordingly, embodiments of the present disclosure also provide for bi-directional active optical cable assemblies.

The optical transmission module 113 comprises a driver circuit 114 and a laser diode 115 (e.g., a vertical-cavity surface-emitting laser ("VCSEL")) as known in the art or later developed. The optical transmission module 113 is electrically coupled to one or more of the first plurality of electrical contacts 112A and receives electrical signals therefrom. The optical transmission module 113 converts the electrical signals into optical signals for optical transmission over the optical cable 120, as indicated by arrow 102.

The optical receiver module 116 comprises a photodiode 117 and an amplifier 118. The optical receiver module 116 receives the optical signals from the optical cable 120 and converts them back into the electrical domain as electrical signals that are provided to the second plurality of electrical contacts 112B on the second connector 110B. The photodiode 117 converts the optical signals into electrical signals, while the amplifier 118 may be a transimpedance amplifier and/or a limiting amplifier that amplifies the electrical signal produced by the photodiode 117 such that it satisfies requirements of the protocol for which the active optical cable is designed.

The optical power P of a laser diode 115 is a function of the drive current I and the device temperature T (i.e., the temperature of the optical transmission module 113) and is given by the following equation:

$$P(I, T) = \eta_d(T)\frac{\hbar\omega}{e}(I - I_{th}(T)), \quad \text{Eq. (1)}$$

where the temperature depended change of the laser-threshold current is defined by:

$$I_{th}(T_a) = I_{th}(T_b)\exp\left(\frac{T_b - T_a}{T_o}\right), \quad \text{Eq. (2)}$$

and the differential efficiency is defined by:

$$\eta_d(T_a) = \eta_d(T_b)\exp\left(\frac{T_b - T_a}{T_1}\right). \quad \text{Eq. (3)}$$

Figure 2:
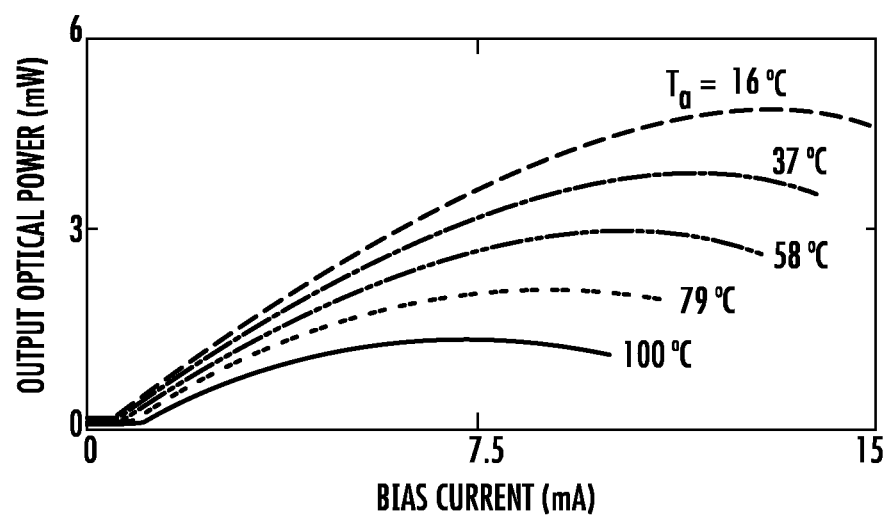
FIG. 2 graphically depicts optical output power as a function of bias current for a plurality of temperatures.

When changing between two temperatures, $T_b$ and $T_a$, there is an exponential dependence. FIG. 2 graphically illustrates this exponential dependence by showing a corresponding data set of output optical power versus drive current of a VCSEL for different temperatures. FIG. 2 illustrates that, for a fixed bias-current, the output optical power of the VCSEL decreases with increasing temperature. Thus, increases in temperature may potentially impact the operability of the active optical cable assembly.

Figure 3:
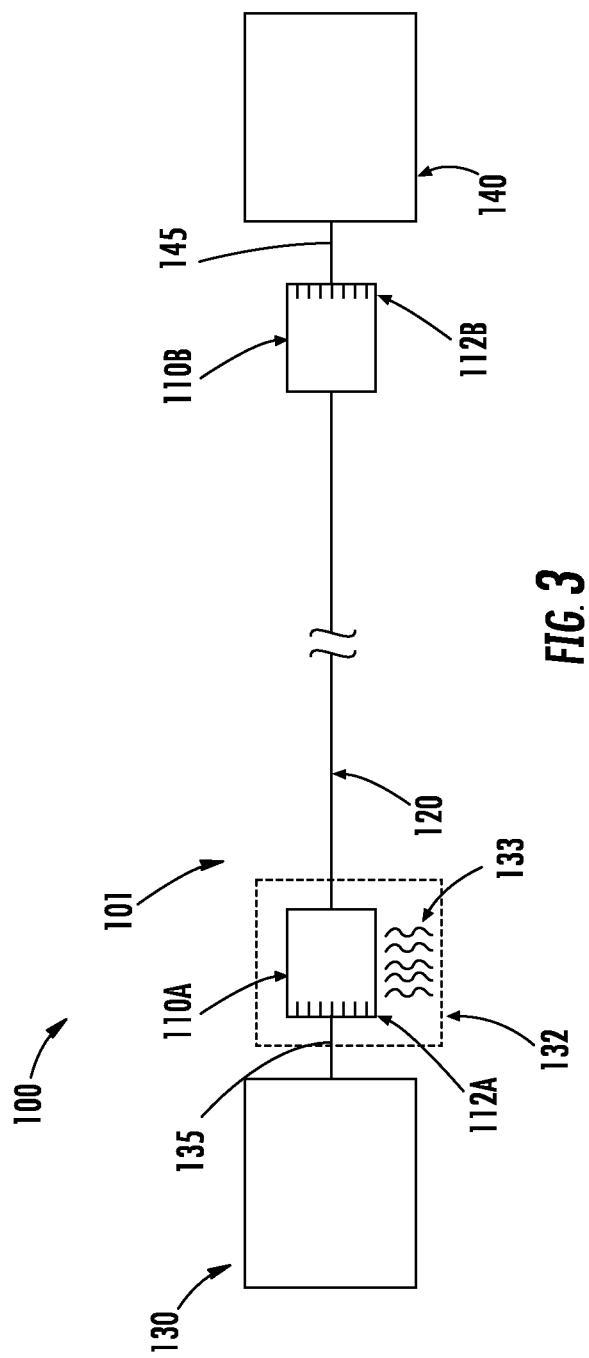
FIG. 3 schematically depicts a system for thermally testing an active optical cable assembly according to one or more embodiments described and illustrated herein.

FIG. 3 schematically depicts an example system 100 for thermally testing an active optical cable assembly 101 according to one or more embodiments. In the illustrated embodiment, the first connector 110A of the active optical cable assembly 101 (e.g., an active optical cable assembly 101 as depicted in FIG. 1) is electrically coupled to a first electronic device 130 by a first electrical connection 135 (e.g., via the first plurality of electrical contacts 112A), and the second connector 110B is electrically coupled to a second electronic device 140 by a second electrical connection 145 (e.g., via the second plurality of electrical contacts 112B). It is noted that, in some embodiments, the first and second electronic device 130, 140 is configured as a single electronic device as described below and illustrated in FIG. 4.

Generally, the first electronic device 130 is a device that is capable of providing electrical signals to the first connector 110A, and the second electronic device 140 is a capable of receiving and detecting the converted electrical signals provided by the second connector 110B. Operation of the active optical cable 101 is compared with a benchmark to determine whether or not the particular active optical cable assembly 101 satisfies the benchmark with respect to thermal performance. An active optical cable assembly that does not meet the benchmark requirement(s) may be below the optical power budget minimum due to increased temperature, while an active optical cable assembly that does meet the benchmark requirement(s) may perform well when operating temperatures are high.

Still referring to FIG. 3, the operating temperature of the first connector 110A and therefore the optical transmission module 113 (see FIG. 1) is increased by heat 133 generated by a heat generating source 132. In the embodiment illustrated in FIG. 1, the heat generating source 132 is external to the first connector 110A. However, as described in detail below, in other embodiments the heat generating source may be internal to the first and/or second connector 110A, 110B. The heat generating source 132 may be any device capable of increasing the temperature of the optical transmission module 113, such as, but not limited to, a thermal wrap, a heat gun, and an oven. The heat generating source 132 is configured to increase the temperature of the optical transmission module 113 over a range of desired temperatures. As a non-limiting example, the heat generating source 132 may be configured to increase the temperature of the optical transmission module 113 from about 16° C. to an upper operating temperature of about 100° C. internal to the connector, as shown in FIG. 2.

In some embodiments, a temperature sensor (not shown) is provided within the housing 111A that sends temperature data with respect to the operating temperature of the optical transmission module 113 as an electrical signal over the first plurality of electrical contacts 112A or to an internal controller. In other embodiments, the operating temperature of the optical transmission module 113 is estimated based on the heat 133 generated by the heat generating source 132 and the thermal characteristics of the electronic components within the housing 111A.

In operation, the heat generating source 132 increases the temperature of the optical transmission module 113 while the first electronic device 130 provides electrical signals to the first connector 110A. The electrical signals are converted to optical signals by the optical transmission module 113. The optical signals are converted to electrical signals by the optical receiver module 116 at the second connector 110B. The converted electrical signals are detected by the second electronic device 140 (or first electronic device 130 in embodiments that utilize only one electronic device) and an analysis is performed to determine if the active optical cable assembly 101 meets a benchmark.

In some embodiments, the benchmark is qualitative. In such embodiments, the first electronic device 130 may be a host device capable of providing a data stream to the first connector 110A in the form of electrical signals, and the second electronic device 140 may be a client device capable of being communicably coupled to the host device by the active optical cable assembly 101 and receiving the converted electrical signals from the second connector 110B. As an example and not a limitation, the host device may be a personal computer, and the client device may be an electronic device such as an external hard drive or a computer monitor. The qualitative benchmark may be any characteristic that indicates that the client device (i.e., the second electronic device 140) is still communicably coupled to the host device (i.e., the first electronic device 130) at or above a threshold temperature of the optical transmission module 113. As a non-limiting example, the host device may be a personal computer and the client device may be an external hard drive, and the qualitative benchmark is whether or not the external hard drive gets ejected from the host device when the optical transmission module is at or about a threshold temperature. If the external hard drive is ejected from the personal computer when the optical transmission module 113 is below the threshold temperature, then the particular active optical cable assembly 101 under thermal evaluation does not meet the benchmark and fails the thermal test.

As another non-limiting example, the host device (i.e., the first electronic device 130) may be a personal computer and the client device (i.e., the second electronic device 140) may be a display. The personal computer may send image data to the display by way of providing electrical signals to the active optical cable assembly 101. The qualitative benchmark may be whether or not the display properly displays the image data without distortions when the optical transmission module is at or above a threshold temperature.

Further, the second electronic device 140, which may be a hard drive or a display, for example, may provide packet receipts to the first electronic device, such as a personal computer. These packets may be evaluated to determine if any errors in the transmission were encountered during the thermal test.

As another non-limiting example, the first electronic device 130 may be a first personal computer and the second electronic device 140 may be a second personal computer. The first personal computer provides a test data stream in the form of electrical signals to the first connector 110A of the active optical cable assembly 101. The second personal computer may evaluate a sub-set of the bits that are provided by the test data stream to determine if the communication link provided by the active optical cable assembly 101 is satisfactory. For example, the test data stream may comprise periodic header packets comprising a sequence of header bits. The second computer may evaluate some or all of the of the header bits as the temperature of the optical transmission module 113 is increased to determine if the communication link is satisfactory. The benchmark may be defined as successful receipt of all of the evaluated bits (e.g., header bits) by the second personal computer, or successful receipt of some percentage of all of the evaluated bits.

Figure 4:
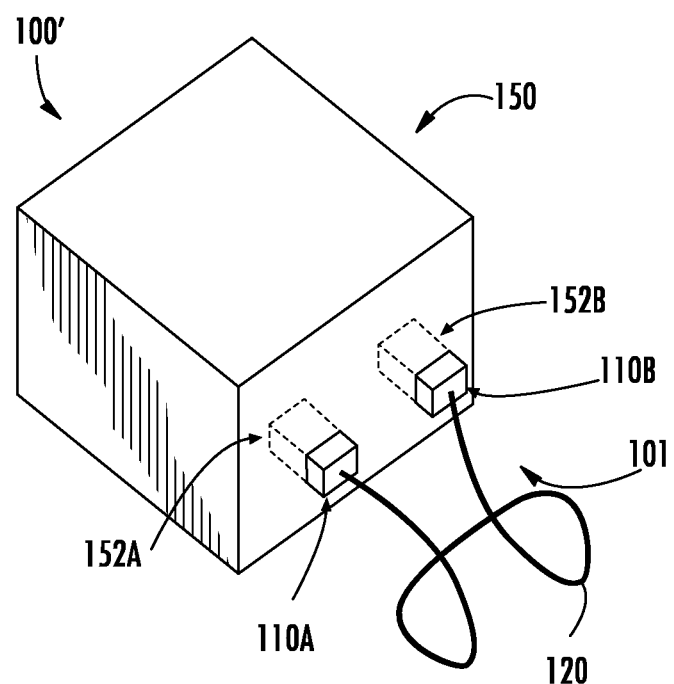
FIG. 4 schematically depicts a system for thermally testing an active optical cable assembly, the system including a bit error rate tester according to one or more embodiments described and illustrated herein.

The benchmark may also be a quantitative benchmark in some embodiments. Referring now to FIG. 4, an example system 100' for thermally testing an active optical cable assembly 101 is schematically depicted. In the illustrated embodiment, a single electronic device is used to evaluate the active optical cable assembly 101. The electronic device may be configured as a bit error rate tester 150. The bit error rate tester 150 may be any known or yet-to-be-developed bit error rate tester. It should be understood that, although the illustrated bit error rate tester 150 is illustrated as a single physical unit, the bit error rate test may be configured as two physical units. In other embodiments, other functions in the same equipment or different equipment capable of quantitatively evaluating the active optical cable assembly 101 may be utilized, such as an eye mask tester, a power consumption test, and the like.

The bit error rate tester 150 is configured to send a test data stream in the form of electrical signals at a first port 152A, and receive electrical signals after transmission over a cable assembly (e.g., the illustrated active optical cable assembly 101) at a second port 152B. The bit error rate tester may only test bit errors, but may also test for eye mask clearance, power consumption, and the like.

As shown in FIG. 4, the first connector 110A is connected to the first port 152A of the bit error rate tester 150 and the second connector 110B is connected to the second port 152B of the bit error rate tester 150. Electrical signals representing the test data stream are converted into optical signals by the optical transmission module 113 within the first connector 110A. The optical signals propagate across the optical cable 120 and are converted back into electrical signals by the optical receiver module 116 within the second connector 110B, as described above. The converted electrical signals are received by the bit error rate tester 150 at the second port 152B. The bit error rate tester 150 detects and evaluates the electrical signals for bit errors. Heat is applied to the optical transmission module 113 within the first connector 110A by any appropriate method, such as those described above and below.

Figure 5:
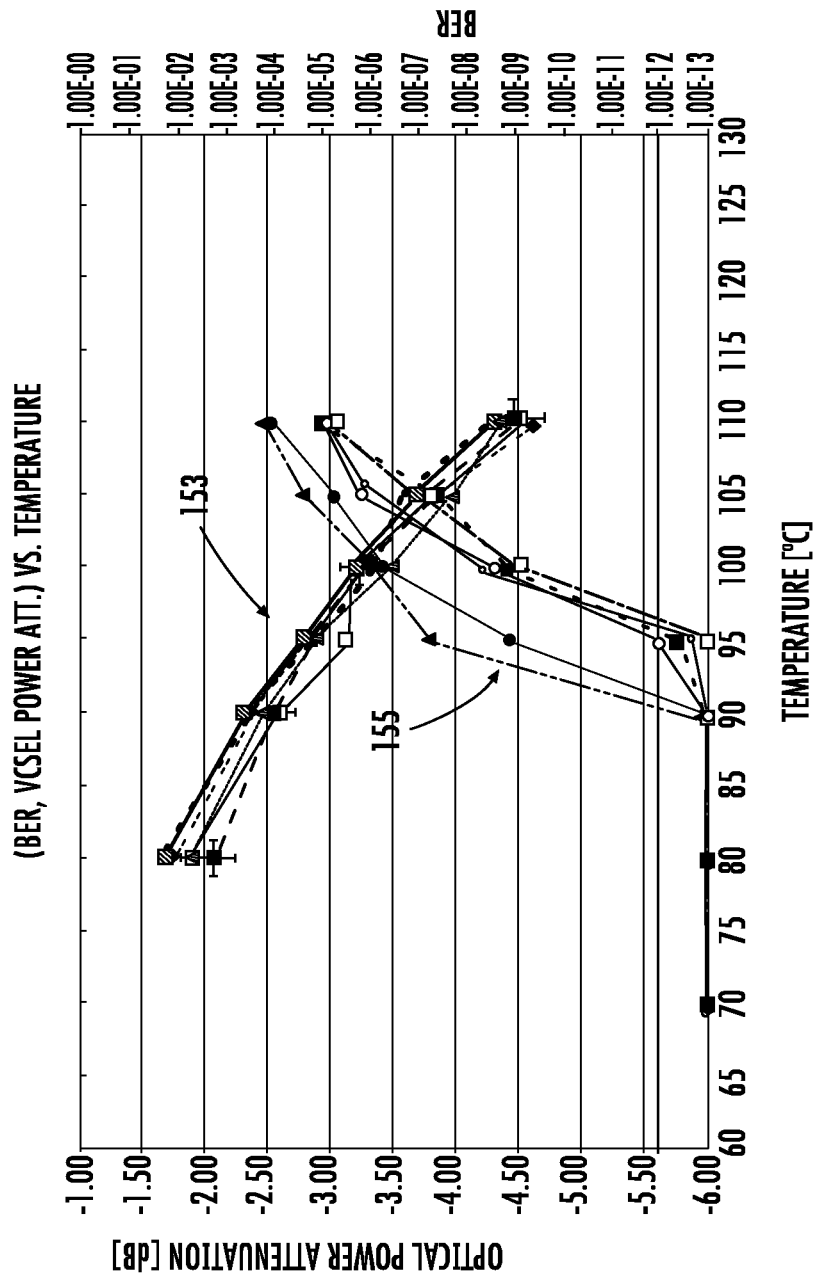
FIG. 5 graphically depicts optical power attenuation relative to the room temperature optical power and detected bit error rate as a function of connector temperature for six sample active optical cable assemblies according to one or more embodiments described and illustrated herein.

As described above, heat causes a reduction of optical power in the laser diode 115 of the optical transmission module 113. This reduction of optical power may cause bit errors to occur in the received electrical signals. Several sample active optical cable assemblies were evaluated using a bit error rate tester as the temperature of the first connector 110A was increased. FIG. 5 is a graph that plots reduction of optical power with respect to the optical power at room temperature of the same active optical cable assemblies (curves 153) and the detected bit error rate (curves 155) as a function of connector temperature for six sample active optical cable assemblies. As illustrated by FIG. 5, the optical power of the laser diodes is reduced as the temperature of the connector increases. For the measured active optical cable assemblies, bit errors begin to occur at 90° C., which corresponds to a reduction of optical power margin of approximately 3 dB.

A quantitative benchmark may be established empirically. For example, the quantitative benchmark may be a threshold bit error rate at a threshold temperature (e.g., an average bit error rate of experimentally tested active optical cable assemblies at 100° C.). However, it should be understood that any quantitative benchmark or benchmarks may be established depending on the particular case. Those active optical cable assemblies that do not meet the quantitative benchmark may be discarded or otherwise processed.

It is noted that the bit error rate tester 150 may be configured to bi-directionally test an active optical cable assembly. For example, the first port 152A and the second port 152B may be configured to both send and receive electrical signals.

Figure 6:
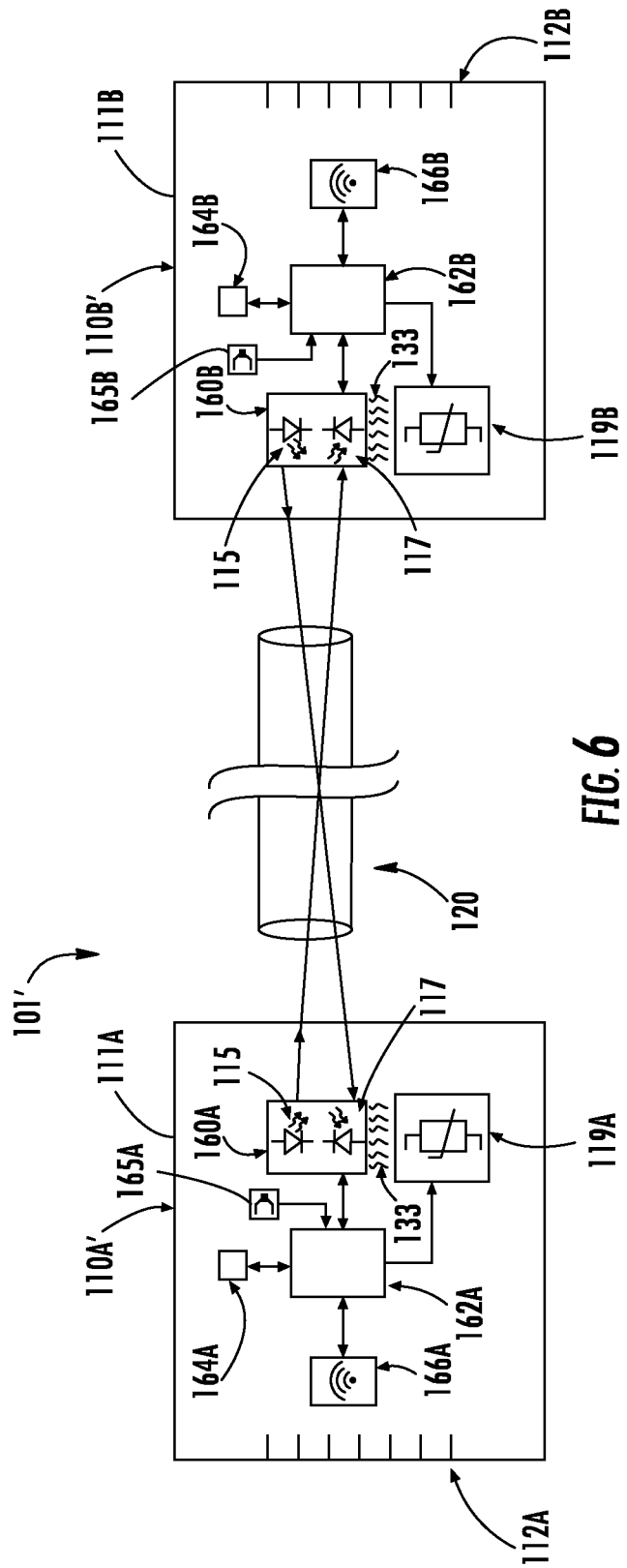
FIG. 6 schematically depicts an active optical cable assembly having a first and second internal heat generating device according to one or more embodiments described and illustrated herein.

In some embodiments, the heat may be generated from within the first and/or second connector of the active optical cable assembly rather than by an external heat source. FIG. 6 schematically depicts an active optical cable assembly 101' according to one or more embodiments. The first connector 110A' includes a first optical engine 160A and the second connector 110B' includes a second optical engine 160B. Each of the first and second optical engines 160A, 160B include a laser diode 115 and a photodiode 117 among other optical transmission and receiver module components. Although the active optical cable assembly 101' is illustrated as being bi-directional, it should be understood that the active optical cable assembly 101' may also be uni-directional.

The first connector 110A' includes a first internal heat generating test component 119A and the second connector 110B' includes a second internal heat generating test component 119B. It should be understood that the first and second connectors 110A', 110B' may each include more than one internal heat generating test component. In uni-directional embodiments, only one of the first and second connectors may include an internal heat generating test component (i.e., the connector having the optical transmission module).

The first and second internal heat generating test components 119A, 119B are disposed within the first and second connectors 110A', 110B', respectively, and are configured to generate heat, thereby raising the operating temperature of the first and second optical engines 160A, 160B, respectively, over the range of desired temperatures. The first and second internal heat generating test components 119A, 119B may be configured as any component capable of controllably generating heat to raise the temperature of the optical transmission module (e.g., an optical transmission module provided in an optical engine) across the range of desired temperatures. In some embodiments, the first and second internal heat generating test components 119A, 119B are configured as one or more resistors. In some embodiments, the first and second internal heat generating test components 119A, 119B are configured as one or more positive temperature coefficient thermistors.

The first and second internal heat generating test components 119A, 119B may generate heat in response to current flowing therethrough. In some embodiments, one or more electrical signals provided to the plurality of electrical contacts 112A, 112B cause the first and/or second internal heat generating test components 119A, 119B to increase in temperature, thereby raising the temperature of the first and/or second optical engines 160A, 160B and the laser diodes associated therewith. Although not shown in FIG. 6, a controllable switch may selectively connect and disconnect the first and second internal heat generating test components 119A, 119B from a voltage source or ground connection.

As shown in FIG. 6, the first and second internal heat generating test components 119A, 119B may be communicatively coupled to first and second controllers 162A, 162B, respectively, in some embodiments. The first and second controllers 162A, 162B may be configured as any microcontroller or processor having inputs and outputs capable of executing instructions. In some embodiments, the first and second controllers 162A, 162B are also responsible for controlling or otherwise interfacing with the first and second optical engines 160A, 160B, respectively. In other embodiments, the first and second heat generating components 119A, 119B are not controllable by controllers.

The illustrated first and second connectors 110A', 110B' also include first and second non-transitory memory modules 164A, 164B, respectively (e.g., flash memory, electrically erasable programmable read only memory, and the like). The first and second non-transitory memory modules 164A, 164B may store computer-readable instructions that, when executed by the first and second controllers 162A, 162B, cause the first and second controllers 162A, 162B to control the first and second internal heat generating test components 119A, 119B to generate heat according to the thermal tests described herein.

The first and/or second connectors 110A', 110B' may enter a thermal testing process in response to a trigger signal. In some embodiments, the trigger signal may be provided to the first connector 110A' (or the second connector 110B') at the first plurality of electrical contacts 112A (or the second plurality of electrical contacts 112B) in the form of electrical signals. The trigger signal may instruct the first controller 162A to cause the first internal heat generating test component 119A to generate heat (or instruct the second controller 162B to cause the second internal heat generating test component 119B to generate heat).

In some embodiments, the first and/or second connectors 110A', 110B' include a first and/or second wireless signal module 166A, 166B, respectively. The first and second wireless signal modules 166A, 166B may be configured as any wireless device capable of receiving a wireless trigger signal generated by an external source. Example wireless devices include, but are not limited to, radio-frequency identification readers, wireless fidelity devices, Bluetooth® devices, and magnetic field detection devices. The first and second wireless modules 166A, 166B may be communicatively coupled to the first and second controllers 162A, 162B, respectively. Upon receipt of a wireless trigger signal, the first or second wireless signal module 166A, 166B may communicate an indication as to the receipt of the wireless trigger signal to the first or second controller 162A, 162B, respectively. The first or second controller 162A, 162B may then, in response to the indication of the received trigger signal, cause the first or second internal heat generating test component 119A, 119B to generate heat, respectively.

The first and/or second connectors 110A', 110B' may also include first and second temperature sensors 165A, 165B positioned proximate the first and second optical engines 160A, 160B, respectively. The first and second temperature sensors 165A, 165B may be communicatively coupled to the first and second controllers 162A, 162B, respectively, to provide internal temperature information thereto. The first and second controllers 162A, 162B may use the internal temperature information to control the amount of heat generated by the first and second heat generating component 119A, 119B to achieve the desired internal temperature (e.g., using a feedback loop).

Using the first and/or second internal heat generating test components 119A, 119B, the active optical cable assembly 101' may be thermally tested way of the qualitative and quantitative methods described above. For example, the first connector 110A' may be connected to a host device (e.g., a first electronic device 130 as illustrated in FIG. 3) and the second connector 110B' may be connected to a client device (e.g., a second electronic device 140 as illustrated in FIG. 3). Upon receipt of a trigger signal, the first or second internal heat generating test component 119A, 119B may produce heat to raise the temperature of the optical transmission module 113 across a range of desired temperatures. The electrical signals received at the opposite end of the active optical cable assembly 101' may then be evaluated in view of a qualitative benchmark as described above.

In another example, the active optical cable assembly 101' may be electrically connected to a bit error rate tester 150 as shown in FIG. 4. Upon receipt of the trigger signal, the first or second internal heat generating test component 119A, 119B may produce heat to raise the temperature of the optical transmission module 113 across the range of desired temperatures. The bit error rate tester 150 may provide the test data stream, and receive the electrical signals at the opposite end of the active optical cable assembly 101'. The received electrical signals may be evaluated in view of a quantitative benchmark as described above.

In embodiments that incorporate a first and/or a second internal heat generating test component 119A, 119B, a first and/or a second controller 162A, 162B, and a first and/or a second non-volatile computer-readable memory 164A, 164B, the thermal testing may be performed independently without the first or second electronic device 130, 140. For example, the first and/or second non-volatile computer-readable memory 164A, 164B may store computer-readable instructions that cause the first or second controller 162A, 162B to instruct the optical transmission module 113 of the respective first or second connector 110A', 110B' to emit, in response to a trigger signal, a test data stream in the form of optical signals. The instructions further cause the first or second internal heat generating test component 119A, 119B to generate heat as the test data stream is transmitted. In such a manner, the test data stream is produced internally and not provided externally by an electronic device.

The first and/or second non-volatile computer-memory 164A, 164B includes further instructions that cause the first or second controller 162A, 162B to receive the electrical signals from the optical receiver module 116 of the first or second connector 110A', 110B'. The instructions may further cause the controller to either store some or all of the test stream data in the first or second non-volatile computer-readable memory 164A, 164B, or perform an analysis on the received test stream data (i.e., the received electrical signals) to determine if the active optical cable assembly 101' satisfies a benchmark and then store an indication as to whether or not the active optical cable assembly 101' satisfied the benchmark in the first or second non-volatile computer-readable memory 164A, 164B. For example, the first or second controller 162A, 162B may be programmed to perform a bit error rate analysis on the received test stream data (e.g., by evaluating all of the bits, or some portion of the bits, such as header bits). The first or second controller 162A, 162B may then store an indication whether or not the particular active optical cable assembly 101' satisfies the benchmark.

In some embodiments, a visual indication, such as a light emitting diode, may provide an indication that the active optical cable assembly 101' has not satisfied the benchmark. In other embodiments, the active optical cable assembly 101' is connected or wireless read to an electronic device that accesses the first and/or second non-volatile computer-readable memory 164A, 164B to determine whether or not the active optical cable assembly 101' satisfies the benchmark. In still other embodiments, the test data steam is stored in the first and/or second non-volatile computer-readable memory 164A, 164B. The active optical cable assembly 101' may be connected to an electronic device that accesses the stored test data stream (in the first and/or second connector 110A', 110B') and then performs a qualitative or quantitative analysis.

The thermal testing of the active optical cable assembly 101' may be initiated upon loading of firmware during manufacturing of the cable assembly. One or more internal heat generating devices may warm up after the firmware is loaded. The benchmark analysis may be performed as, or just after, a test data stream is sent, or during a subsequent analysis session where data stored in the active optical cable assembly 101' is extracted and analyzed.

It should now be understood that embodiments described herein are directed to active optical cable assemblies, and methods for thermally testing active optical cable assemblies after the manufacturing process is completed. The methods described herein may use internal or external heat sources to thermally test the active optical cable assemblies. Embodiments may also utilize qualitative and/or quantitative benchmarks to determine the thermally induced reduction of optical power of active optical cable assemblies across a range of desired temperatures.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

We claim:

1. A method of thermally testing an active optical cable assembly, the method comprising:
   providing electrical signals to an optical transmission module within a first connector that converts the electrical signals into optical signals for transmission over one or more optical fibers of the active optical cable assembly;
   applying heat to the first connector by an internal heat generating test component disposed within the first connector to raise a temperature of the optical transmission module over a range of desired temperatures as the electrical signals are provided to the optical transmission module;
   detecting electrical signals at a second connector of the active optical cable assembly as the temperature of the optical transmission module is raised, wherein the detected electrical signals are converted from the optical signals on the one or more optical fibers by an optical receiver module within the second connector; and
   determining if the optical transmission module satisfies a benchmark at a threshold temperature of the optical transmission module based on the electrical signals detected at the second connector.

2. The method of claim 1, wherein the internal heat generating test component comprises a resistor.

3. The method of claim 1, wherein the internal heat generating test component comprises a positive temperature coefficient thermistor.

4. The method of claim 1, further comprising receiving a trigger signal, the trigger signal causing a current to flow through the internal heat generating test component to raise the temperature of the optical transmission module over the range of desired temperatures.

5. The method of claim 4, wherein the trigger signal is received at electrical contacts of the first connector.

6. The method of claim 4, wherein the trigger signal is a wireless signal.

7. The method of claim 1, further comprising:
   monitoring an internal temperature within the first connector proximate to the optical transmission module; and
   controlling the internal heat generating test component based at least in part on the monitored internal temperature by a feedback loop.

8. The method of claim 1, wherein:
   the electrical signals are applied to electrical contacts of the first connector by a bit error rate tester; and
   the detected electrical signals are detected at electrical contacts of the second connector by the bit error rate tester.

9. The method of claim 8, wherein the benchmark is a quantitative benchmark defined by a threshold bit error rate at a threshold temperature.

10. The method of claim 1, wherein:
    the electrical signals are applied to electrical contacts of the first connector by a host device; and
    the detected electrical signals are detected at electrical contacts of the second connector by a client device.

11. The method of claim 10, wherein the benchmark is a qualitative benchmark defined by whether the client device remains communicatively coupled to the host device by the active optical cable assembly at a threshold temperature.

12. The method of claim 10, wherein the client device detects one or more header bits of packet headers of the detected electrical signals.

13. An active optical cable assembly comprising:
    an optical cable comprising at least one optical fiber;

a first connector comprising a first plurality of electrical contacts, wherein the first connector is optically coupled to a first end of the optical cable, the first connector comprises:
- an optical transmission module configured to convert electrical signals received at the first plurality of electrical contacts into optical signals for transmission over the at least one optical fiber; and
- an internal heat generating test component within the first connector, wherein the internal heat generating test component is configured to generate heat to raise a temperature of the optical transmission module over a range of desired temperatures as the optical transmission module converts the electrical signals into the optical signals;

a second connector comprising a second plurality of electrical contacts, wherein:
- the second connector is optically coupled to a second end of the optical cable;
- the second connector comprises an optical receiver module; and
- the optical receiver module converts the optical signals received on the at least one optical fiber into converted electrical signals that are provided to the second plurality of electrical contacts.

14. The active optical cable assembly of claim 13, wherein the internal heat generating test component comprises a resistor.

15. The active optical cable assembly of claim 13, wherein the internal heat generating test component comprises a positive temperature coefficient thermistor.

16. The active optical cable assembly of claim 13, wherein the first connector further comprises:
- a controller; and
- a non-transitory computer-readable memory storing instructions that, when executed by the controller, cause the controller to, in response to receiving a trigger signal, cause the internal heat generating test component to generate the heat such that the temperature of the optical transmission module is raised over the range of desired temperatures.

17. The active optical cable assembly of claim 16, further comprising a temperature sensor disposed within the first connector proximate to the optical transmission module, wherein:
- the temperature sensor is communicatively coupled to the controller;
- the temperature sensor provides a signal with respect to a temperature within the first connector proximate to the optical transmission module; and
- the controller controls the internal heat generating test component based at least in part on the signal provided by the temperature sensor.

18. The active optical cable assembly of claim 16, wherein the trigger signal is received at the first plurality of electrical contacts.

19. The active optical cable assembly of claim 16, wherein:
- the first connector further comprises a wireless signal module; and
- the trigger signal is configured as a wireless signal operable to be received by the wireless signal module.

20. The active optical cable assembly of claim 16, wherein the instructions further cause the controller to send a test data stream as the electrical signals provided to the optical transmission module.

21. The active optical cable assembly of claim 16, wherein:
- the electrical signals define a test data stream; and
- the second connector comprises:
  - a second controller; and
  - a second non-transitory computer-readable memory storing instructions that, when executed by the second controller, cause the second controller to:
    - receive the converted electrical signals; and
    - store a representation of the converted electrical signals in the second non-transitory computer-readable memory.

22. The active optical cable assembly of claim 21, wherein the instructions further cause the controller to:
- determine whether or not the converted electrical signals satisfy a benchmark at a threshold temperature of the optical transmission module; and
- store an indication of whether or not the converted electrical signals satisfy the benchmark.

23. The active optical cable assembly of claim 13, wherein:
- the second connector further comprises a second optical transmission module and a second internal heat generating test component, wherein:
  - the second optical transmission is configured to convert electrical signals received at the second plurality of electrical contacts into optical signals for transmission over the at least one optical fiber; and
  - the second internal heat generating test component is configured to generate heat to raise a temperature of the second optical transmission module over a range of desired temperatures as the second optical transmission module converts the electrical signals into the optical signals; and
- the first connector further comprises a second optical receiver module, wherein the second optical receiver module converts the optical signals received on the at least one optical fiber from the first connector into converted electrical signals that are provided to the first plurality of electrical contacts.

* * * * *